United States Patent
Clarke

(10) Patent No.: US 6,462,795 B1
(45) Date of Patent: Oct. 8, 2002

(54) DISPLAY SYSTEM HAVING CURVED MICROLENS ARRAY BETWEEN FLAT MATRIX DISPLAY PANEL AND SIMILARLY CURVED VIEWING SCREEN

(75) Inventor: John A. Clarke, Carshalton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 202 days.

(21) Appl. No.: 09/610,718

(22) Filed: Jul. 6, 2000

(30) Foreign Application Priority Data

Jul. 12, 1999 (GB) ............................................. 9916286

(51) Int. Cl.[7] ............................................. G02B 27/01
(52) U.S. Cl. .......................................... 349/95; 349/11
(58) Field of Search ...................... 349/95, 11

(56) References Cited

U.S. PATENT DOCUMENTS 5,291,334 A * 3/1994 Wirth et al. ................. 359/622
5,500,747 A * 3/1996 Tanide et al. ................. 359/40
6,133,687 A * 10/2000 Clarke ......................... 313/478
6,215,593 B1 * 4/2001 Bruce ......................... 359/619

OTHER PUBLICATIONS

Hutley et al., "Microlens Arrays", Physics World, Jul. 1991. pp. 27–32.

* cited by examiner

Primary Examiner—Toan Ton
Assistant Examiner—Andrew Schechter
(74) Attorney, Agent, or Firm—Aaron Waxler

(57) ABSTRACT

A display system comprises a substantially flat matrix display panel (10), for example an LCD, a viewing screen (12) spaced from the panel and curved in one or more directions, for example to conform with the contour of a support structure (16), and an image transfer arrangement (14) comprising at least one microlens array curved in a similar sense to the screen and disposed between the panel and the screen whose individual lens elements transmit respective portions of the image on the panel onto corresponding positions on the screen. The arrangement may comprise imaging, field and re-imaging arrays (20, 21, 22) in series with corresponding lens elements in the arrays having a common optical axis.

11 Claims, 2 Drawing Sheets

DISPLAY SYSTEM HAVING CURVED MICROLENS ARRAY BETWEEN FLAT MATRIX DISPLAY PANEL AND SIMILARLY CURVED VIEWING SCREEN

BACKGROUND OF THE INVENTION

The present invention relates to a display system comprising a substantially flat matrix display panel producing a display output.

Flat panel matrix display panels such as liquid crystal display devices (LCDs) are now commonly used as alternatives to traditional CRTs (Cathode Ray Tubes) in many different display applications where, for example, their relative compactness and their flat viewing surface offer advantages over CRTs. However, while these attributes make them particularly attractive for a range of display purposes, there can be situations where, for example, for ergonomic design, aesthetic or other like reasons, it would be useful for the LCD panel's viewing surface to be curved rather than flat. Examples of such applications could include stylised television receivers using unconventional cabinet shapes, portable display equipment, children's toys, and displays in vehicles. For instance, it is known to incorporate LC display panels vehicle dashboards as information displays and in the back of headrests in vehicle seats for video display purposes and it would be beneficial if the display viewing surface were curved so as to conform with the dashboard or head rest contours and present a continuous curved surface flush with the surrounding structure. If the display panel were simply recessed and a curved transparent window placed thereover, there is a tendency for a viewer to focus on the window rather than the display panel which leads to viewing difficulties. As yet, flexible LCD panels using plastics substrates rather than the conventional glass substrates and suitable for these kinds of applications are not commercially viable.

It is known to project the display output of an LCD panel by means of a projection lens enlarged onto a curved projection screen. Such a system may be used as a wide angle LC projection system suitable for specific purposes such as gaming or audio—visual entertainment and enabling a viewer to be partially surrounded by the enlarged display image. However, such a system is totally unsuitable for normal display applications in which display images corresponding approximately to the size of the pixel array of the display panel are required.

SUMMARY OF THE INVENTION

According to the present invention, there is provided a display system comprising a substantially flat matrix display panel, a curved viewing screen arranged over, and spaced from, the output side of the panel and an optical image transfer arrangement disposed between the curved screen and the output side of the panel and comprising at least one microlens array which is curved in the same general direction as the screen and which has spaced apart lens elements for transmitting respective portions of the image produced at the output side of the panel onto corresponding positions on the curved screen. Through such image transfer arrangement, the image produced by the panel is relayed in simple manner to a curved viewing screen, for example curved to present a continuous surface conforming to, and flush with, the surface contour of a surrounding structure. Importantly, the required microlens array occupies little space so a compact arrangement is obtained. This makes it possible to achieve the desired object in a space saving manner and with the image produced on the viewing screen being of similar dimensions to that produced by the panel.

The matrix display panel preferably comprises an LCD although other types of substantially flat display panels such as electroluminescent, field emission, and electrochromic display panels could be used instead.

The viewing screen may be curved in one or more directions. As simple examples, the screen may be of a part cylindrical, barrel, or spherical form. By suitable microlens array design the desired image shape, conforming with such types of curvature, can be conveniently obtained in relatively simple manner. While the array is curved in the same general sense as the screen, its curvature does not have to correspond. The microlens array is curved such that its spacing from the panel varies over its area in similar manner to the curvature of the viewing screen. By changing the spacings between the microlens array and the panel over its area the object and image distances in the arrangement are varied and this effect is utilised to re-image the display produced by the panel onto the curved viewing screen such that the object to image distances obtained are varied in corresponding manner to conform with the curvature of the viewing screen. For optimal imaging, preferably there is a variation in the powers of individual lens elements over the area of an array as well as curving of an array, such variation being either in the curved array and/or one of the other arrays. As mentioned, the viewing screen may be curved in one or more dimensions. As well as having a generally symmetrical form, for example, part cylindrical shape, non-symmetrical curvatures are also easily possible.

Although a single microlens array may be adequate in certain circumstances, for example, where each display pixel (e.g. colour triplet) of the display panel is associated with a respective lens element of the array, the image transfer arrangement preferably comprises a plurality of microlens arrays, each having spaced apart lens elements, with corresponding lens elements in the arrays being optically associated with one another. Such an arrangement can enable an individual lens element to be larger and associated with a group of adjacent display pixels. Alternatively, in the case where a first array has a respective lens element for each display pixel, a second array comprising field lenses may be used to improve optical performance.

In a preferred embodiment, the image transfer arrangement comprises, in order from the panel, a first, imaging, microlens array, a second, field, microlens array and a third, re-imaging, microlens array, the first, second and third microlens arrays being arranged such that each microlens element in one array is on the same optical axis as a corresponding microlens elements in each of the other arrays and with each group of corresponding microlenses elements relaying a respective portion of the image to the viewing screen. Such a microlens system enables the image produced on the panel to be relayed in a non-inverted manner onto the viewing screen. Each group of microlens elements can then work with a large area of the display comprising multiple pixels, for example between 10 and 100 colour triplets. Only one of the arrays need be curved. Preferably, the powers of the microlenses elements in one or more of the arrays are varied over the area of the array according to the curvature of the screen so that the display output is correctly re-imaged on the curved screen.

By forming the curved microlens array as a sheet using a plastics material the required curving can be obtained relatively easily. Where curving in a single dimension is required, the sheet may be simply bent. Where curving in two dimensions is required the sheet can readily be moulded appropriately in that shape. If the power of individual microlens elements in an array are to vary in accordance with the curvature of the viewing screen, then different radii or different refractive indices can be used.

In order to avoid or reduce optical crosstalk, and improve efficiency, light baffle means may be provided adjacent at least one of the arrays, preferably the first array, so as to prevent light reaching a microlens element other than from the intended direction. In a particularly preferable arrangement, the light baffle means are provided between the first and second arrays. Such light baffle means for example, may be provided conveniently in the form of a honeycomb structure disposed in front of the first array or between the first and second arrays. In addition, a further microlens array comprising field microlens elements, each corresponding to, and arranged on the same optical axis as, a respective microlens element in the first array may be provided close to, and preferably directly on, the output side of the panel to improve light utilisation.

BRIEF DESCRIPTION OF THE DRAWINGS

Embodiments of display systems in accordance with the present invention will now be described, by way of example, with reference to the accompanying drawings, in which.

It will be appreciated that the figures are merely schematic and have not been drawn to scale. The same reference numerals are used throughout the drawings to indicate the same or similar parts.

DETAILED DESCRIPTION OF THE PREFERRED EMBODIMENTS

Figure 1:
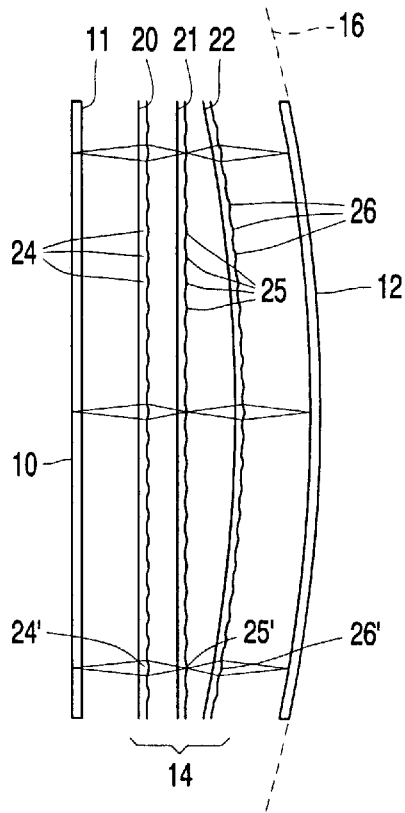
FIG. 1 is a schematic sectional view of one embodiment of display system according to the invention illustrating the optical arrangement.

With reference to FIG. 1, the system comprises a flat LC display panel 10 of conventional form that is operable to produce a display image at its output side 11, a curved transparent viewing screen 12 spaced from the output side of the LC panel, and an image transfer arrangement 14 for relaying the image produced by the LC panel 10 at its output side onto the viewing screen 12 for viewing by a person at the side of the viewing screen remote from the LC panel. The LC panel can be of any known type, typically comprising a pair of transparent substrates between which liquid crystal material is disposed and carrying facing electrodes defining a two dimensional, row and column, matrix array of pixels which are individually energisable to modulate light transmitted through the panel to generate a display image at the output side. The viewing screen 12 may be of plastics or other suitable optically transparent material and may be curved in one dimension, for example with a cylindrical curvature, or in two dimensions, for example of spherical or barrel curvature, depending on the requirements in use. One side of the screen, preferably that facing the panel 10, is formed with a diffusing surface. The display system is suitable for mounting in a surrounding support structure, such as a television housing, vehicle seat, vehicle dashboard, children's toy, or other article which has a curved form with the viewing screen conforming to, and flush with, the outer contour of the article's structure, as denoted by the dotted line 16 in FIG. 1.

In the cross-sectional view of FIG. 1, the curved screen 12 is shown as being arranged generally symmetrically with respect to the LC panel 10 with its concave side facing the panel 10. It will be appreciated though that the screen may be arranged non-symmetrically and that different curvatures may be used.

The image transfer arrangement 14 comprises a series of microlens arrays each having a two dimensional array of spaced apart microlenses, and arranged such that each microlens in one array is on the same optical axis as a corresponding microlens in each other array. The arrangement of FIG. 1 comprises three microlens arrays 20, 21 and 22 of similar overall size, corresponding approximately with the size of the display area of the LC panel and the viewing screen. The arrays 20 and 21 are substantially flat, and parallel with the panel 10, while the array 22 is curved in the same general direction as the screen 12. Each array comprises a two dimensional, row and column, regular array of individual converging microlenses, some of which are indicated at 24, 25 and 26, which together serve to relay a display image produced at the output side of the LC panel 10 and focus it onto the screen 12. In the figure, only a small number of microlenses are shown and their size has been greatly exaggerated for clarity. The number of microlenses in an array would depend on a number of factors, for example, the overall size of the panel, the individual pixel sizes and a desired resolution. As a typical example the microlenses may be spaced between 0.1 and 10 millimeters apart.

Corresponding microlenses 24, 25 and 26 in the three arrays are substantially aligned so as to have a common optical axis, which is substantially perpendicular to the plane of the panel 10, and each group of three lenses serves to relay a respective portion of the display image, non-inverted, onto a respective corresponding part of the screen 12. To this end, the microlenses 24, 25 and 26 of the three arrays 20, 21 and 22 act as imaging lenses, field lenses and re-imaging lenses respectively, the purpose of each field microlens 25 being to image its associated imaging microlens 24 onto its associated re-imaging microlens 26.

In this embodiment, the powers of all the lenses in the array 20 are substantially the same and are chosen such that the intermediate images formed on the array 21 are smaller than the corresponding portion of the object on the LC panel. Example ray paths from three different points on the LC panel 10 are illustrated in FIG. 1, a respective group of three microlenses associated with one of these being indicated at 24', 25' and 26'. Each microlens 24 in an associated group collects light from a respective image portion of the LC panel 10 and forms an inverted image of that portion at, or close to, the plane of the microlens array 21. The microlens 26 of the group concerned then forms a non-inverted image on the viewing screen 12. In the example illustrated, the microlens 25 images the microlens 24 on the microlens 26 so that substantially all the useful light received by a microlens 24 is transmitted to the corresponding microlens 26. Thus, the intermediate microlens 25 in the array 21 prevents light spreading.

The spacing of the arrays 20, 21 and 22 from the LC panel 10 and the screen 12, and the spacing between the corresponding microlenses in the three arrays are selected so as to provide appropriate object to image distances in accordance with the curvature of the screen whereby the points on the flat LC panel are all imaged on the curve of the viewing screen 12 at substantially unity magnification. The corresponding microlenses 24, 25 and 26 in the three arrays are spaced from one another by amounts dependent on their position in relation to the screen 12. The arrays 20 and 21 are disposed substantially parallel to the plane of the LC panel and consequently the spacing between associated microlenses 24 and 25 is the same for all groups. The spacings between the arrays 21 and 20 and between the array 20 and the LC panel 10 are selected in dependence on the power of the microlenses 24 in the imaging array 20 so that the respective points of the LC panel are imaged at the plane of the array 21. The re-imaging array 22 is curved in a similar manner to the viewing screen 12 in the same general direction as the screen so that it presents a concave surface towards the panel and so that the spacings between microlenses 26 and their associated microlenses 25 in the array 21 progressively vary over the area of the arrays according to the variation on the distance between the corresponding points on the viewing screen 12 and the LC panel 10. Although the curvature of the array 22 is in the same sense as the screen it differs slightly from that of the screen. The spacing between associated microlenses 26 and 25 reach a maximum at the centre and a minimum at the edge where the screen is respectively furthest away and closest to the LC panel, such that the total object to image distances for the groups of associated microlenses vary accordingly. In this particular embodiment, the ratio of the distance between a microlens 25 and the associated microlens 26 and the distance between the microlens 26 and the screen is substantially constant.

The microlenses in the array 20 may be substantially identical. The other arrays, particularly the array 22, have microlenses whose powers vary over the area of the array, having for example different radius of curvature, refractive index, etc., to ensure that the image formed on the screen is in focus.

In an alternative arrangement, the array 20 and/or the array 21 may be curved instead of, or as well as, the array 22. If the array 20 is curved, its curvature could be in the same sense as, or opposite to, the curvature of the array 22. The aforementioned spacing ratio condition would then no longer apply.

Each microlens array 20, 21 and 22 comprises a microlens sheet and may be formed using any suitable known technique, for example with the microlenses of the sheet being produced from reformed thermoplastic resin. In such a method, the array substrate is coated with a thermoplastic resin layer which is subsequently patterned by means of photolithography to provide discrete portions, each corresponding to an individual microlens, in the desired positions. Thermal reflow of the resin layer at a predetermined temperature then causes the resin to reform in a convex lens shape. Various methods of producing microlens arrays, whether shaped, graded-index, or diffractive are described in the article "Microlens Arrays" in Physics World, July 1991, pages 27–32. The microlens sheets may be formed in plastics by a moulding technique.

In each microlens array, the individual microlenses may be separated from one another by intervening flat portions of the sheet and these flat portions may be covered by black light absorbing material, in the form of a black matrix, to prevent non-imaging light passing through the arrangement.

Figure 2:
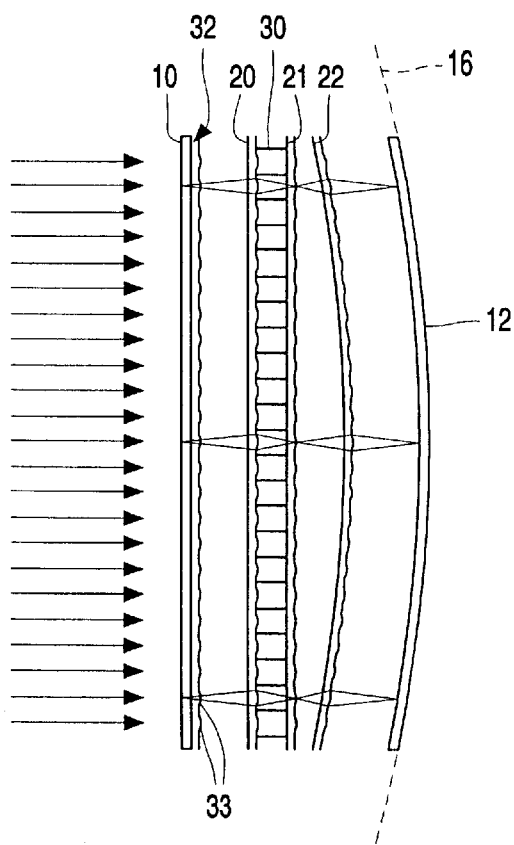
FIG. 2 is a schematic sectional view of a second embodiment of display system according to the invention.

Another embodiment of the display system is illustrated in FIG. 2 in which additional measures are taken to increase efficiency and reduce optical crosstalk. These measures can be used alone or in combination. In this embodiment, each associated pair of microlenses 24 and 25 in the arrays 20 and 21 has light baffle means 30 extending around the optical paths between them so as to prevent light reaching the microlenses concerned other than from the intended direction. Each associated pair of microlenses 24 and 25 is then effectively optically isolated from its neighbouring microlens pairs. This light baffle means may conveniently be provided in the form of a honeycomb structure of light absorbing material arranged as shown in FIG. 2 extending between the two arrays 20 and 21. Alternatively, the light baffle means, again for example in the form of a honeycomb structure, could be provided over the side of the array 20 facing the panel or between the arrays 21 and 22.

Also in this embodiment, a further microlens array 32 is disposed over, and preferably bonded directly to, the output side of the LC panel which comprises microlenses 33. Each microlens 33 corresponds to a respective microlens 24, 25 and 26 in the arrays 20, 21 and 22 and is arranged to lie on the same optical axis as its respective associated microlenses 24, 25 and 26. The LC panel 10 is arranged to be illuminated with collimated light, as denoted by the parallel arrows in FIG. 2, and the individual microlenses 33 serve as field lenses to direct the light into the individual microlenses 24. This ensures that the maximum amount of light from the panel is utilised effectively.

The same principles regarding curvature of the array 22 etc apply as in the preceding embodiment.

With regard to both embodiments, then instead of having substantially unity magnification, with the size of the display image relayed onto the screen 12 being approximately the same as the size of the display image on the LC panel 10, a small magnification or reduction in size may be achieved, if desired, by arranging that the microlens spacing in each array is slightly different. Each respective group of microlenses 24, 25 and 26 would still all lie on a straight line but not necessarily parallel to the perpendicular to the panel 10.

Figure 3:
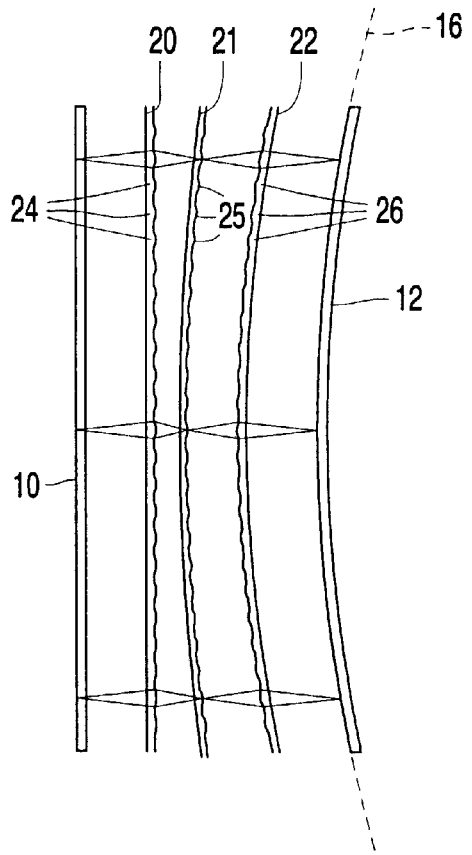
FIGS. 3 and 4 are schematic sectional views of two further example embodiments according to the invention.

FIG. 3 illustrates a still further embodiment demonstrating the curvature of the microlens arrays 21 and 22 required to accommodate, for example, a viewing screen 12 of concave form rather than the convex form in the embodiment of FIG. 1. If desired, the microlens array 20 could also be curved. Alternatively, the microlens array 21 could be flat as in the embodiment of FIG. 1.

Figure 4:
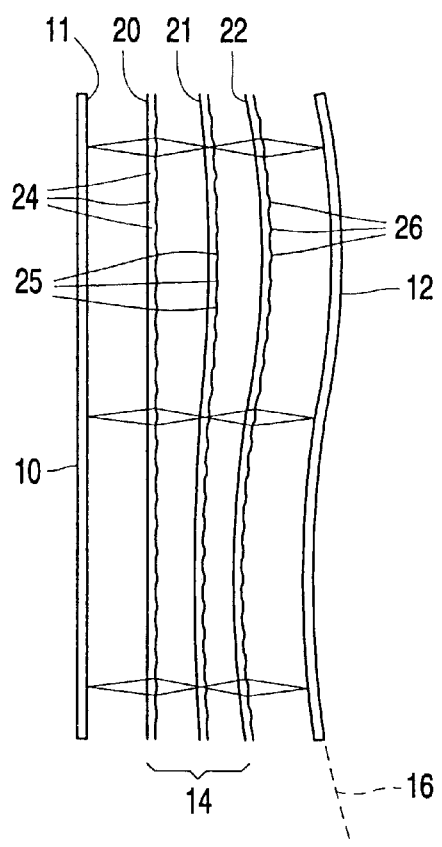

Referring now to FIG. 4, there is shown a still further embodiment which demonstrates how the microlens image relaying arrangement is able to accommodate a viewing screen 12 having a more complicated curvature. As can be seen, the microlens arrays 21 and 22 are then both curved in a manner related to the screen curvature. The array 20 may also be curved if desired. Alternatively the array 21 would be flat.

The same general principles of operation apply to the embodiments of FIGS. 3 and 4 as in the earlier embodiments.

In all the above described embodiments, each group of three microlenses 24, 25, 26, may be associated with just one pixel of the display panel (comprising a red, green and blue triplet in a full colour display panel), or with a plurality of adjacent pixels. In the former case, it will be appreciated that it is not necessary for each group of associated microlenses in the image transfer arrangement to relay a respective portion of the display non-inverted, and as a consequence the array 20 and the array 21 could perhaps be omitted. Such an arrangement may still include if desired the field lens array 32 and light baffle means on either side of the array 22, It is envisaged that flat matrix display panels other than LC display panels could be used instead, for example electroluminescent or field emission display panels.

From reading the present disclosure, other modifications will be apparent to persons skilled in the art. Such modifications may involve other features which are already known in the fields of LC displays and microlens arrays and component parts thereof and which may be used instead of or in addition to features already described herein.

What is claimed is:

1. A display system comprising a substantially flat matrix display panel, a curved viewing screen arranged over, and spaced from, the output side of the panel and an optical image transfer arrangement disposed between the curved screen and the output side of the panel and comprising at least one microlens array which is curved in the same general direction as the screen and which has spaced apart lens elements for transmitting respective portions of the image produced at the output side of the panel onto corresponding positions on the curved screen.

2. A display system according to claim 1, wherein the image transfer arrangement comprises a plurality of microlens arrays, each having spaced apart lens elements and with corresponding lens elements in the arrays being optically associated with one another in a group for transmitting and re-imaging respective portions of the image.

3. A display system according to claim 2, wherein the image transfer arrangement comprises, in order from the panel, a first, imaging, microlens array, a second, field, microlens array and a third, re-imaging, microlens array, the first, second and third microlens arrays being arranged such that each lens element in one array is on the same optical axis as a corresponding lens element in each of the other arrays and with each group of corresponding lens elements relaying a respective portion of the image to the viewing screen.

4. A display system according to claim 2, wherein each group of associated lens elements in the plurality of arrays transmits light from a respective group of adjacent pixels of the display panel.

5. A display system according to claim 2, wherein the powers of the individual lens elements in one or more of the arrays vary over the area of the array in accordance with the curvature of the screen.

6. A display system according to claim 3, wherein at least the third, re-imaging, microlens array is curved.

7. A display system according to claim 3, wherein light baffle means are provided adjacent one side of the first microlens array for shielding the light path through the arrays.

8. A display system according to claim 7, wherein the light baffle means are provided between the first and second microlens arrays.

9. A display system according to claim 7, wherein the light baffle means are provided in the form of a honeycomb structure.

10. A display system according to claim 1, wherein the image transfer arrangement includes a further microlens array positioned next to the output side of the display panel and comprising an array of microlenses each of which corresponds to a respective one of the microlenses in the other microlens array(s) and acts as a field lens.

11. A display system according to claim 1, wherein the display panel comprises a liquid crystal display panel.

* * * * *